(12) United States Patent
Harsoor et al.

(10) Patent No.: US 12,386,708 B2
(45) Date of Patent: Aug. 12, 2025

(54) SYSTEM AND METHOD TO PREDICT SESSION FAILURE IN VIRTUAL APPLICATIONS AND DESKTOPS DEPLOYMENT

(71) Applicant: Citrix Systems, Inc., Ft. Lauderdale, FL (US)

(72) Inventors: Sharanabasappa Harsoor, Bengaluru (IN); Vikramjeet Singh Sandhu, Bengaluru (IN); Vinay George Roy, Bengaluru (IN)

( * ) Notice: Subject to any disclaimer, the term of this patent is extended or adjusted under 35 U.S.C. 154(b) by 85 days.

(21) Appl. No.: 17/718,744

(22) Filed: Apr. 12, 2022

(65) Prior Publication Data
US 2023/0325280 A1  Oct. 12, 2023

(51) Int. Cl.
*G06F 11/00* (2006.01)
*G06F 9/455* (2018.01)
*G06F 11/14* (2006.01)

(52) U.S. Cl.
CPC ...... *G06F 11/1415* (2013.01); *G06F 9/45558* (2013.01); *G06F 2201/815* (2013.01)

(58) Field of Classification Search
None
See application file for complete search history.

(56) References Cited

U.S. PATENT DOCUMENTS

| | | | |
|---|---|---|---|
| 10,713,143 B1 * | 7/2020 | Vemulapati | G06F 9/5055 |
| 11,113,144 B1 * | 9/2021 | Gadepalli | G06N 3/08 |
| 2013/0305083 A1 * | 11/2013 | Machida | G06F 11/008 |
| | | | 714/4.1 |
| 2015/0117320 A1 * | 4/2015 | Wang | H04W 4/023 |
| | | | 370/329 |
| 2021/0383206 A1 * | 12/2021 | Teppoeva | G06F 11/004 |
| 2021/0397469 A1 * | 12/2021 | Babu | G06F 11/3419 |
| 2022/0197762 A1 * | 6/2022 | Chopra | G06F 11/2025 |

FOREIGN PATENT DOCUMENTS

WO  WO-2020000405 A1 *  1/2020 ............ G06F 11/004

OTHER PUBLICATIONS

Google Scholar/Patents search—text refined (Year: 2023).*
Google Scholar/Patents search—text refined (Year: 2024).*
Google Scholar/Patents search—text refined (Year: 2025).*

* cited by examiner

*Primary Examiner* — Christopher S Mccarthy

(57) ABSTRACT

A server computer system configured to proactively predict a session failure of a virtual service is provided. The server computer system includes a memory and at least one processor coupled to the memory. The at least one processor is configured to receive one or more feature values associated with the virtual service. The processor can then evaluate a likelihood of session failure of the virtual service, such as a session launch failure, unresponsive state, or persistent session failure, in a future time interval based on the received feature values. The processor can then determine that the likelihood of session failure satisfies a classification test indicating the session failure is likely. Responsive to the determination, the processor can then execute a corrective operation, such as to end a user session, disable the virtual service, restart the virtual service, or render a user notification.

16 Claims, 12 Drawing Sheets

SYSTEM AND METHOD TO PREDICT SESSION FAILURE IN VIRTUAL APPLICATIONS AND DESKTOPS DEPLOYMENT

BACKGROUND

In a typical virtual computing service environment or virtual applications and desktops service, there may be a large number of machines or virtual services (such as Virtual Delivery Agents (VDAs) and/or virtual machine managers), for example thousands. Administrators must keep track of the health of such machines or virtual services.

Downtime of the machines or virtual services may adversely affect the ability of users to perform important computing tasks. In some cases, a machine or virtual service may enter a "black hole" state (i.e., sessions will persistently fail on the machine or virtual service thereafter). Typically, an administrator will discover such a black hole state after it has already caused failures, which can adversely affect user experience (UX).

SUMMARY

In at least one example, a server computer system configured to proactively predict a session failure of a virtual service is provided. The server computer system includes a memory and at least one processor coupled to the memory. The at least one processor is configured to receive one or more feature values associated with the virtual service. The at least one processor is further configured to evaluate a likelihood of the session failure of the virtual service within a future time interval based on the one or more received feature values. The at least one processor is further configured to determine that the likelihood of the session failure satisfies a classification test indicating the session failure is likely. The at least one processor is further configured, responsive to the determination, to execute a corrective operation.

At least some examples of the server computer system can include one or more of the following features. In the system, the one or more feature values can comprise an anomaly score based on a predicted load associated with the virtual service.

In the system, the anomaly score can represent a residual value in the predicted load as a function of a number of sessions.

In the system, the anomaly score can be a standardized anomaly score.

In the system, the at least one processor can be further configured to route a session based on a user priority and the likelihood of the session failure.

In the system, to evaluate the likelihood of the session failure based on the one or more feature values can comprise to apply a supervised learning model to a record of previous sessions.

In the system, the supervised learning model can comprise one or more of: a deep neural network (DNN); a convolutional neural network (CNN); a recurrent neural network (RNN); a long short-term memory (LSTM); or an ensemble model.

In the system, the supervised learning model can comprise a soft-max layer as a last layer. The likelihood of the session failure can comprise a probability of the session failure.

In the system, the corrective operation can comprise one or more of: to end a user session; to disable the virtual service; to restart the virtual service; or to render a user notification of the determination.

In the system, the session failure can comprise a session launch failure, an unresponsive state, or a persistent session failure.

In the system, the virtual service can comprise a Virtual Delivery Agent (VDA) or a virtual machine manager.

In the system, to determine that the likelihood of the session failure satisfies the classification test can comprise to determine that the likelihood of the session failure satisfies the classification test at least a threshold number of times.

In at least one example, a method of proactively predicting a session failure of a virtual service is provided. The method includes acts of receiving one or more feature values associated with the virtual service; evaluating a likelihood of the session failure of the virtual service within a future time interval based on the one or more received feature values; determining that the likelihood of the session failure satisfies a classification test indicating the session failure is likely; and responsive to the determination, executing a corrective operation. The method can further include execution of the system operations described above.

At least some examples are directed to a non-transitory computer readable medium storing executable instructions to proactively predict a session failure of a virtual service. In these examples, the instructions can be encoded to execute any of the acts of the method of proactively predicting a session failure of a virtual service described above or to configure a system to proactively predict a session failure of a virtual service as described above.

Still other aspects, examples and advantages of these aspects and examples, are discussed in detail below. Moreover, it is to be understood that both the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

Figure 1:
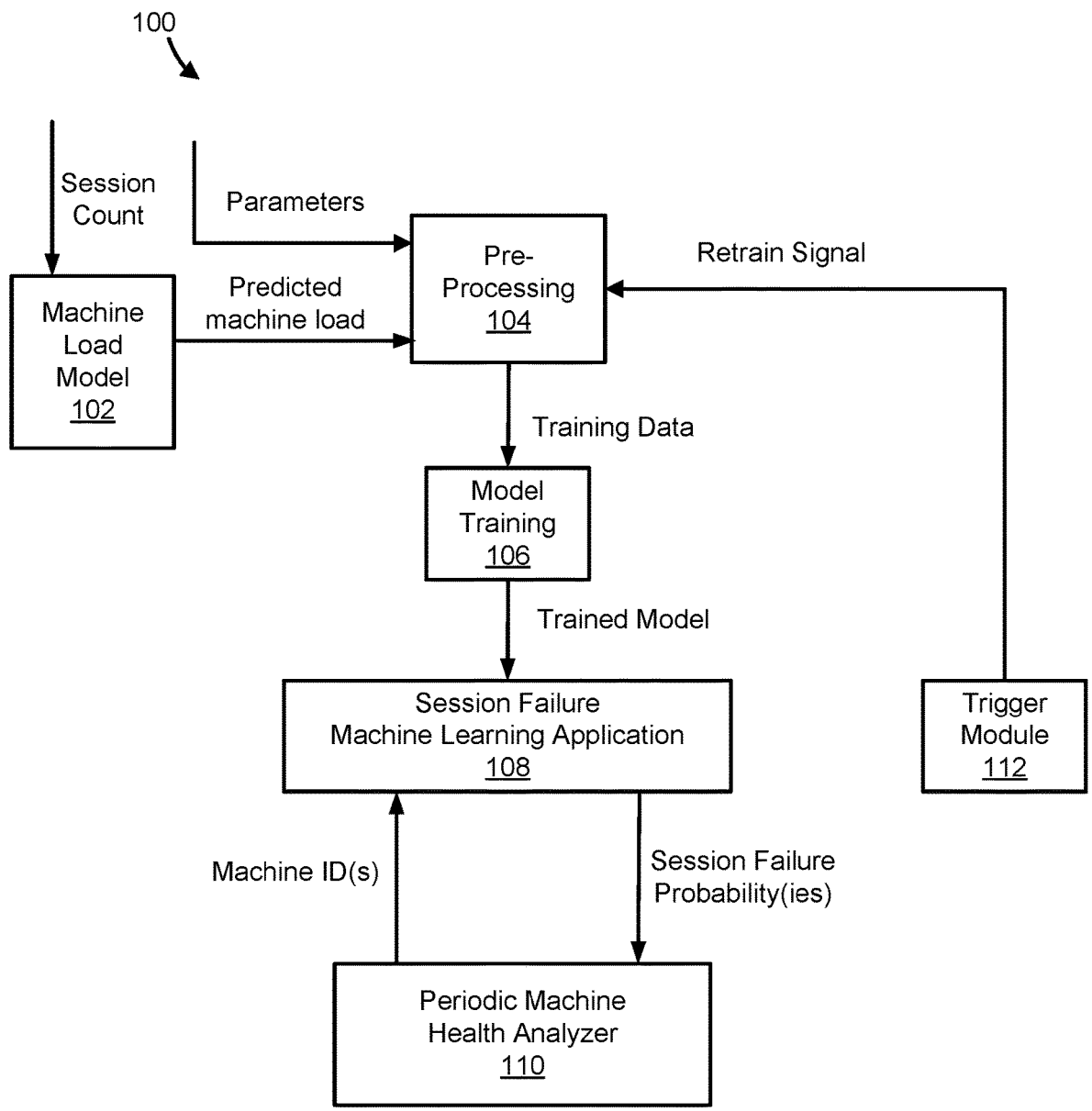
FIG. 1 illustrates a system for proactively predicting a session failure of a virtual service, in accordance with an example of the present disclosure.

As summarized above, various examples described herein are directed to systems and methods to proactively predict a session failure of a virtual service. For a better user experience (UX) in a virtual computing service environment or a virtual applications and desktops service, such as a Citrix Virtual Applications and Desktops Service (CVADS) environment, it is important to provide uninterrupted session connectivity served by the machines or virtual services. Due to the large number of machines or virtual services (such as Virtual Delivery Agents, or VDAs) in a typical environment, for example thousands, it may be a difficult task for administrators to keep track of the health of each machine or virtual service.

The systems and methods described herein can realize a proactive approach to this challenge by predicting session failures in advance, and warning administrators preemptively. For example, a "black hole" state may refer to a state in which sessions will persistently fail on the same machine or virtual service thereafter. The systems and methods described herein can identify such black hole machine or virtual service suspects well before the machines or virtual services go into a black hole state. Accordingly, the systems and methods disclosed herein can improve user experience by predicting and addressing black hole machines or virtual services before they instigate failures that can affect multiple users.

The disclosed systems and methods provide a number of advantages. For example, the system can proactively predict session failures via machine learning (ML) techniques, including by learning historical and/or recent trends. Likewise, the system can raise an alert even before a suspect machine enters a black hole state. Furthermore, the system can detect anomalous resource usage and anomalous machines. The systems can perform intelligent routing of user sessions, e.g. by routing machines or virtual services with lower chance of session failure to high priority users. In addition, the disclosed system and methods can use preprocessed and value infused metrics like UX scores, anomaly scores, CPU usage trend statistics, and the like. Such preprocessed and value infused metrics may enable the model to be lighter, for example by providing good predictive power with relatively few features.

In some examples, the systems and processes for proactively predicting a session failure of a virtual service can be implemented by a session failure prediction service, a periodic machine health analyzer, and/or an ML application, which may execute on a workspace server, such as the digital workspace server 802 of the example of FIG. 8 below. In various examples, the system predicts session failures of a virtual service, such as a VDA or virtual machine manager, that can be used by an end user. In some examples, the disclosed system can predict session failure of a physical machine, such as a computing node or another computing device within a cluster or data center, and is not limited by the present disclosure. The virtual service, VDA, virtual machine manager, and/or physical machine may be referred to herein generally as a machine or a node.

Note that the systems and processes described herein for proactively predicting a session failure of a virtual service can be implemented within a variety of computing resources. Moreover, in some examples, the systems and processes are implemented within a virtualization infrastructure, such as the HDX™ virtualization infrastructure commercially available from Citrix Systems of Fort Lauderdale, Florida, in the United States. In these examples, the session failure prediction systems and processes can be implemented within a workspace client application (also referred to as a digital workspace application), such as the Citrix Workspace™ application; a browser embedded within the workspace client application; a secure browser service, such as the Citrix Secure Browser™ service; a gateway appliance, such as the Citrix Application Delivery Controller™ (ADC); a virtualization agent, and/or other computing resources.

Alternatively or additionally, note that other architectures are possible for the virtualization infrastructure. For example, the disclosed systems and processes for proactively predicting session failure may be hosted by the broker computer 824 of the example of FIG. 8 below, rather than by the digital workspace server 802. Alternatively or additionally, in some cases, an additional server may host the server virtualization agent 822 separately from the digital workspace server 802. Accordingly, this additional server may be selected by the broker computer 824 to support virtual services.

FIG. 1 illustrates a system 100 for proactively predicting a session failure of a virtual service, in accordance with an example of the present disclosure. In an example, system 100 can implement a session failure prediction service, which may execute on a workspace server, such as the digital workspace server 802 of the example of FIG. 8 below. The system 100 includes model training 106 to train a supervised ML model 108 to predict a likelihood that future session launches on each machine will fail, and whether each machine will enter a "black hole" state (i.e., sessions will persistently fail on that machine thereafter). As described above, the system 100 can use these predictions of session failure probability to notify administrators about likely issues, thereby enabling them to perform proactive maintenance, or can use the predictions to guide subsequent allocation and routing of users and sessions to machines. In various examples, the disclosed system and methods can be used with relatively simple ML models or neural network architectures, as well as with more sophisticated models such as deep neural networks (DNN) and the like. For example, the more sophisticated models may require less complex feature engineering.

In this example, the system 100 also includes a resource utilization ML model 102, which can predict the expected resource utilization (e.g., a predicted value of machine_load_score) of a respective virtual service based on the number of sessions. In some examples, the predicted machine_load_score, and/or an anomaly score based on it, may be important features used by the session failure ML model to predict session failure probability. The resource utilization ML model 102 can receive the session count information, for example from a data warehouse, and can send the predicted machine load score to the pre-processing 104. As shown, the pre-processing 104 can also receive parameters for the session failure ML model, for example from a data warehouse.

The trigger module 112 may determine when the session failure ML model should be retrained to ensure it is updated for recent trends. For example, the trigger module 112 may determine that the session failure ML model should be retrained on a periodic basis (e.g., every week, every month, or every two months). In another example, the trigger module 112 may use another criterion to decide when the session failure ML model should be retrained, for example comparing a performance metric of the model to a minimum or threshold value. When the trigger module 112 determines that the session failure ML model should be retrained, the trigger module 112 can send a retrain signal to pre-processing 104.

In response to the retrain signal, the pre-processing 104 can send training data for model training 106. For example, the model training 106 of the disclosed predictive analytics system may obtain as input a broad set of features that analyze resource utilization trends, active sessions, session experience metrics, and the like, for each machine over time. The model training 106 can train, or retrain, the supervised ML model to predict the likelihood of failure and/or of a "black hole" state for each machine based on the received features and/or other training data.

The model training 106 can notify the session failure ML application 108 of the availability of the trained model. In an example, the ML application 108 may be exposed via an application programming interface (API) layer. The ML application 108, in turn, can interoperate with the periodic machine health analyzer 110 using output from the trained model. For example, the periodic machine health analyzer 110 can periodically send machine identifiers (IDs) to the ML application 108, and the ML application 108 can send session failure probabilities corresponding to the machine IDs to the periodic machine health analyzer 110. The periodic machine health analyzer 110 may use the session failure probabilities to notify administrators about likely issues, and/or to route user sessions, as described in the examples of FIGS. 3-6 and 7A-7C below.

In some examples, the system can use anomalies relating to machine resource utilization as a function of the number of user sessions to predict session failure probability. In particular, the relationship between resource utilization and the number of user sessions may typically be linear, as described in the example of FIG. 2A below. When the relationship departs significantly from this typically linear one, or e.g. from a fit thereto, the system may interpret this as an indication of a problem on the node.

Figure 2A:
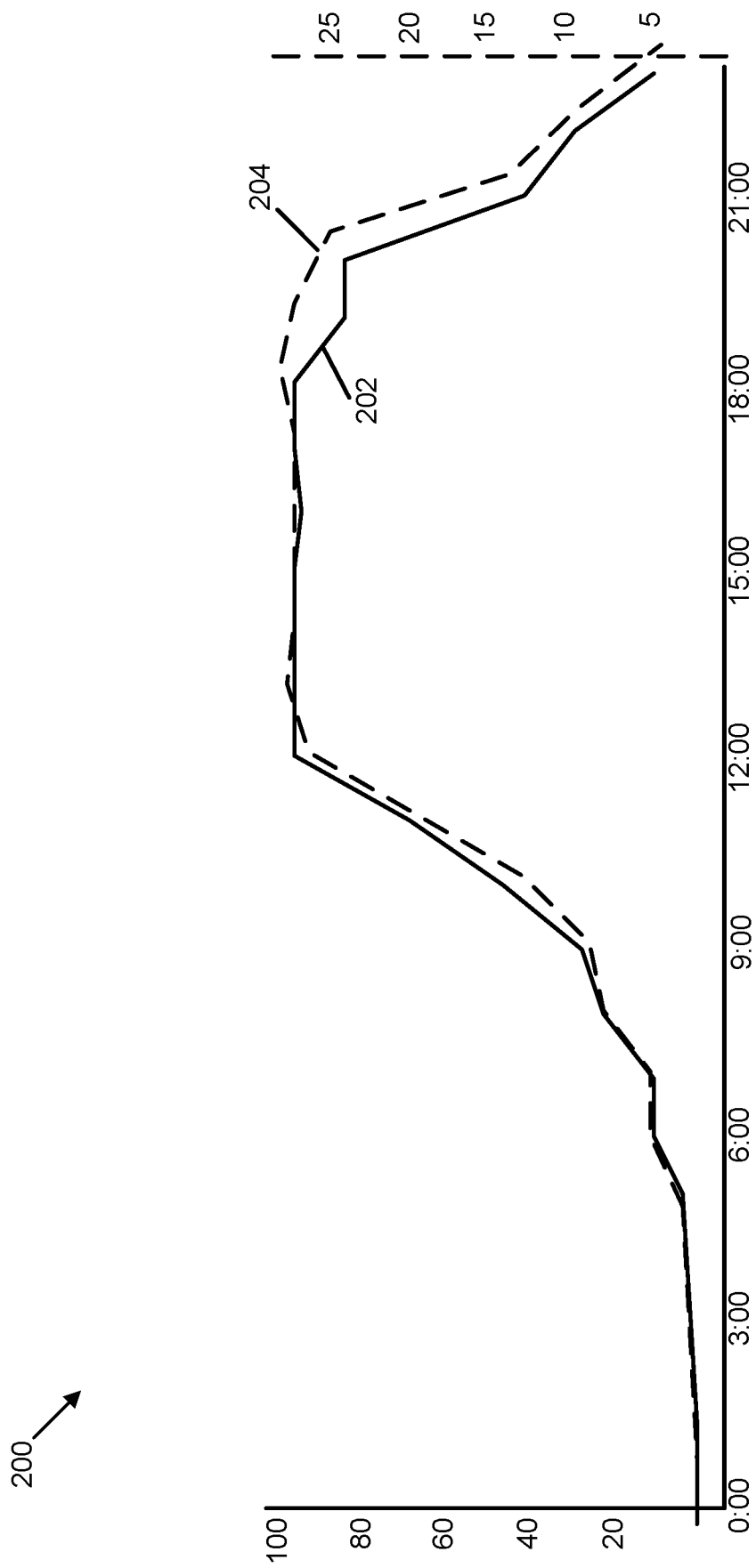
FIG. 2A illustrates an example of machine load and number of user sessions over time.

FIG. 2A illustrates an example 200 of number of user sessions 202 and machine load 204 over time. It is apparent in the example 200 that the resource utilization 204 and number of sessions 202 are strongly correlated, and that the relationship between them is nearly linear. The system can learn and/or confirm the correlation between the number of sessions 202 active in the machine and resource utilization 204 based on training data such as historical data, and use the resulting model to identify anomalous behavior as an early predictor of session failure.

In an example, the disclosed system and methods can fit or learn a relationship between the calculated machine load score 204 and the number of user sessions 202 (for example by using linear regression). Note that an observed variation in the learned relationship may be anomalous, and could serve as an indicator of issues that could result in session failures or black hole states. To identify this anomaly, the system can first determine the expected behavior by applying a baseline model to predict the expected resource utilization (e.g., a predicted value of machine_load_score) from the active sessions based on historical data.

For example, the machine load 204 can be measured by a variable referred to as machine_load_score, resource_utilisation_score, or as final_out, while the number of user sessions 202 is measured by the sum of a variable referred to as payload_sessioncount. These variables may be obtained from a database or data warehouse, and/or may be computed based on other variables or data obtained from a database or data warehouse. In an example, the database may be representative of resource usage of a particular machine or virtual service.

For example, the system may collect data from metrics available from "raw_gold_db.cas_research_x_monitor_current." The resource utilization may be represented using a resource utilization score called "machine_load_score," which the system can compute from payload_sessionindex, payload_effectiveloadindex, payload_memoryindex, payload_percentcpu, payload_cpuindex, payload_usedmemory, payload_totalmemory, and payload_sessioncount. In an example, the system can normalize these values into the range 0 to 1 and sum them to obtain the machine_load_score, which indicates the machine's resource utilization 204, and may also be referred to as final_out.

For example, the payload_effectiveloadindex may be an indicator of the load on a machine or virtual service, which may be obtained from a brokering process. The payload_sessioncount may indicate a raw count of the number of sessions on a machine or virtual service. The payload_sessionindex may be a normalized number (e.g., an integer) that defines the current session load on a machine or virtual service, with a higher number indicating more sessions currently being served. The payload_sessionindex may be a normalized version of payload_sessioncount that can be compared across different machines or virtual services with different available resources. If the payload_sessionindex is 0, this may indicate that the machine or virtual service has no sessions currently connected. There may be no upper limit on the payload_sessionindex, as it may be constrained by resources and the type of machine or virtual service. The payload_memoryindex may be representative of effective strain calculated on the memory. The payload_cpuindex may be representative of effective load on the CPU of a machine or virtual service.

As shown in the example 200, the relationship between the number of sessions 202 and machine load 204 may be approximately linear. For example, the load 204 on the machine may be approximately directly proportional to the number of sessions 202 served by the machine. Accordingly, the system may use a supervised regression training strategy based on historical data and a linear model, "resource_utilization_score_predictor" to learn the relationship between the number of sessions and the resource utilization score. This model is then used to predict the expected resource utilization score for a machine, e.g. to predict the machine_load_score.

The system may also identify large discrepancies from the learned model as anomalous behavior, which may indicate and/or predict session failure, session launch failure, black hole states, and the like. Accordingly, the system may compute an anomaly score as a residual in the learned model, according to: Anomaly_score=Predicted machine_load_score−actual machine_load_score. That is, the anomaly score may quantify a discrepancy between the predicted resource utilization, based on the session count 202, and the actual utilization 204. In an example, the anomaly score is indicative of anomalies in the machine's behavior, relative to the historical behavior of the machine's resource utilization as a function of the number of sessions it serves. Accordingly, in an example, the larger the magnitude of the anomaly score, the greater the probability of an anomaly on the machine.

Figure 2B:
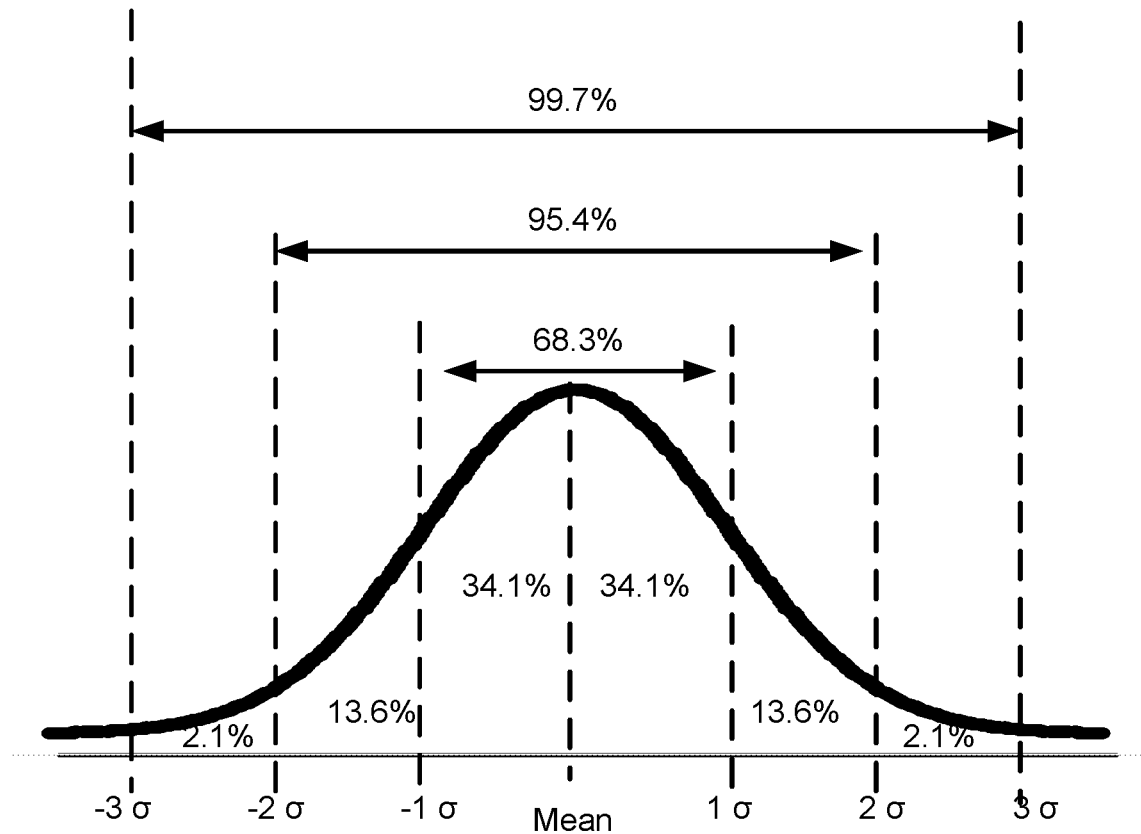
FIG. 2B illustrates an example normally distributed anomaly score pertaining to machine load and number of user sessions.

FIG. 2B illustrates an example normally distributed anomaly score 260 pertaining to machine load and number of user sessions. In FIG. 2B, the horizontal axis is the anomaly_score and the vertical axis is the relative frequency.

In this example, the average anomaly score 260, which may be averaged over many training observations, is a normally distributed random variable. That is, the anomaly score's relative frequency 260 may be centrally distributed and be peaked at an anomaly score value of zero over the majority of the training data. Instances of a larger anomaly score (e.g., an anomaly score significantly larger than the standard deviation in the score's distribution) may be expected to be infrequent. For example, the machine load prediction model's training strategy may serve to minimize the machine load prediction model's residuals as a function of session count, while the anomaly score itself quantifies those residuals. As a result, the anomaly score's relative frequency distribution 260 may approach a normal distribution, as illustrated in this example.

Nevertheless, in some examples, training the downstream classification model to estimate the session failure probability based on the raw anomaly score as a feature may present difficulties. For example, the resource_utilization_score_predictor may be retrained periodically (e.g., every 7 days) to ensure it is updated for recent trends, as in the example of FIG. 1 above, or may otherwise change over time. In some examples, such retraining or changes might lead to shifts in the anomaly score's distribution, such as in the distribution mean value and/or standard deviation. Such shifts could, in turn, necessitate modifications of the downstream classification model and/or the classification test the system uses to determine whether session failure is likely. Accordingly, in some examples the system can transform the raw anomaly score to a standardized score, which may remain comparable in spite of variations in the load prediction model's parameters. Indeed, the standardized score may reliably reflect a current likelihood of a residual in the machine load regression model as a function of number of sessions even when the anomaly score distribution shifts.

For example, instead of classifying session failure probability based on the raw anomaly score directly, the system may standardize the anomaly score to its z-score. Thus, in this example, the system may compute a z-score measuring how many standard deviations the raw anomaly score is away from its mean value: Standardized_anomaly_score=z-score in the distribution of anomaly score with respect to session counts=(Anomaly_score−Average of anomaly_score)/Standard deviation of anomaly_score. In some examples, the system may estimate the probability of a machine being anomalous, and/or the probability of session failure, based at least in part on the magnitude of a standardized score, such as the anomaly score's z-score. This standardized anomaly score can remain comparable across variations in the load prediction model, thereby adapting to recent trends, while reliably demonstrating the degree of anomalous behavior relative to such trends.

In some examples, the anomaly score, standardized anomaly score, and/or z-score may be important features for predicting session failures. In various examples, the model may use any number of other features. For example, such other features can include: device and/or machine identifiers (deviceIDs/machineIDs); CPU usage trend statistics, such as a current CPU usage percentage—a rolling average of CPU usage percentage during session failures (e.g., in the last 7 days); memory usage trend statistics, such as a current memory usage percentage—a rolling average of memory usage percentage during session failures (e.g., in the last 7 days); remaining memory available (e.g., in MB) or maximum memory—current memory; disk usage trend statistics, such as a current disk usage percentage—a rolling average of disk usage percentage during session failures (e.g., in the last 7 days); load index; ICA latency; UX scores obtained from the system; disk latency; health check store; number of sessions; last session failure flag, such as a Boolean flag indicating whether the last attempted session was successful; number of failures in the last four attempted sessions; operating system (OS) of the machine; and time elapsed since last attempted session. These features will be described further in the example of FIG. 5 below. Alternatively or additionally, the system can use any other features, and is not limited by the present disclosure.

Figure 3:
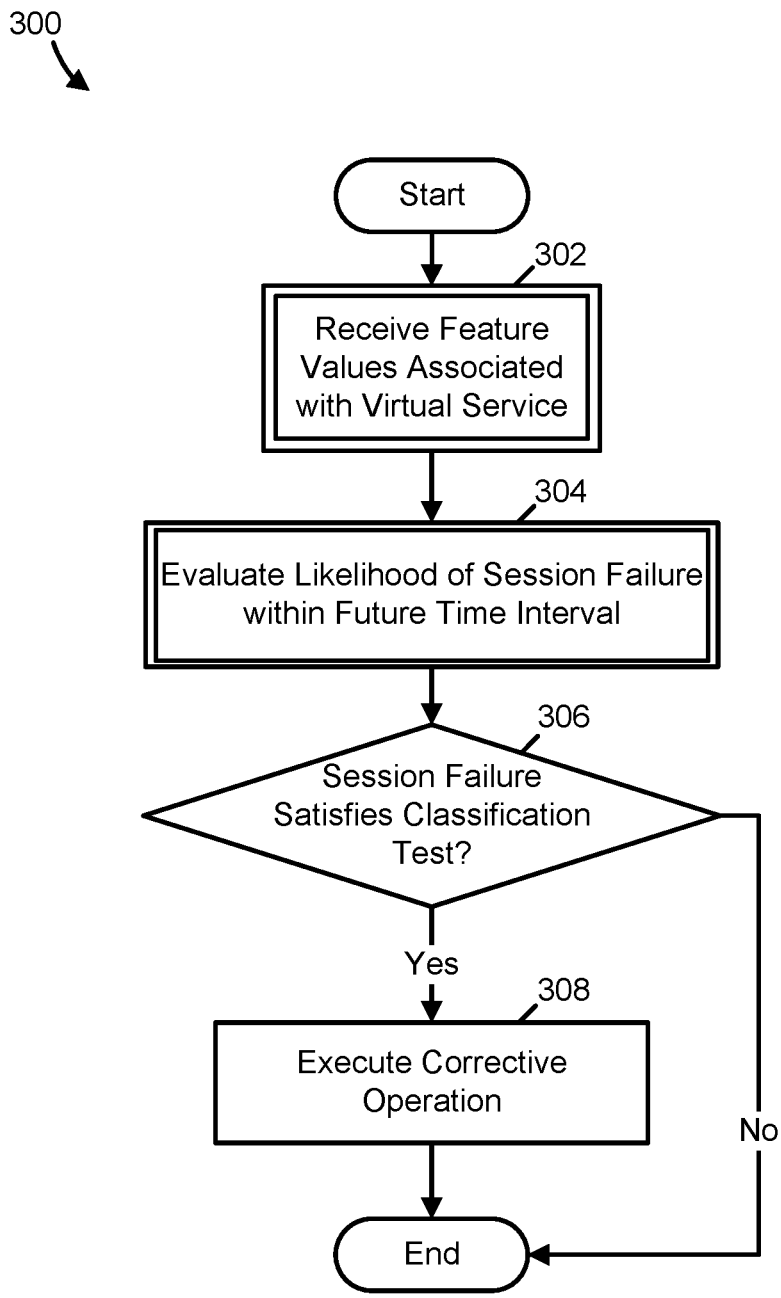
FIG. 3 is a flow diagram of a process for proactively predicting a session failure of a virtual service, in accordance with an example of the present disclosure.

FIG. 3 is a flow diagram of a process 300 for proactively predicting a session failure of a virtual service, in accordance with an example of the present disclosure. In some examples, the process 300 may be implemented by a session failure prediction service, which may execute on a workspace server, as in the examples of FIG. 1 above and FIG. 8 below. Alternatively or additionally, the process 300 may be executed by a server computer system or by another computer system, such as computing device 900 of the example of FIG. 9 below, or may be implemented within a virtualization infrastructure, as described in the example of FIG. 8 below, and is not limited by the present disclosure. In various examples, the virtual service can include a VDA or a virtual machine manager, such as a hypervisor. In some examples, the system can predict session failure of a physical machine, such as a computing node or another computing device, and is not limited by the present disclosure.

As shown in FIG. 3, the process for proactively predicting a session failure starts with the session failure prediction service receiving 302 one or more feature values associated with the virtual service. The system may predict session failures such as session launch failures, unresponsive states, and/or persistent session failures such as black hole states.

The received feature values can include measured values corresponding to an ML model. In an example, the received feature values can include an anomaly score representing a residual value in the predicted load as a function of the number of sessions, as described in the example of FIG. 2A above. The anomaly score may be standardized, such as a z-score, as described in FIG. 2B. Additional details of measuring the anomaly score are described in FIG. 4 below. Alternatively or additionally, the feature values can include other features, such as CPU usage, memory usage trends, disk usage trends, UX scores, last session failure flags, and the like, as described in the example of FIG. 5 below.

Next, the session failure prediction service can evaluate 304 a likelihood of the session failure of the virtual service within a future time interval based on the one or more received feature values.

In some examples, the system evaluates the likelihood of session failure by applying a supervised learning model based on the received feature values to a record of previous sessions. In some examples, the supervised learning model can include a DNN, a convolutional neural network (CNN), a recurrent neural network (RNN), a long short-term memory (LSTM), and/or an ensemble model. In some examples, the supervised learning model includes a soft-max layer as a final layer, and accordingly the likelihood of session failure may be a probability.

Next, the session failure prediction service can determine 306 that the likelihood of the session failure satisfies a classification test indicating the session failure is likely. For example, the system may evaluate the likelihood of session failure as a probability (e.g., using a soft-max layer), and can then compare the probability of session failure to a threshold value. In another example, the system may classify the likelihood of session failure, such as with an ordinal classification. In yet another example, the system may use another statistical test.

In some examples, a user may set a strictness setting instructing the system to determine that the likelihood of session failure satisfies the classification test at least a threshold number of times before fully removing the virtual service from circulation, as described in the example of FIG. 6 below.

Next, responsive to the determination that the likelihood satisfies the classification test, the session failure prediction service can execute 308 a corrective operation. For example, the corrective operation may include ending a user session, disabling the virtual service, restarting the virtual service, or rendering a user notification of the determination. In some cases, the system may execute 308 the corrective operation after determining the likelihood satisfies the classification test a threshold number of times, or may execute 308 different corrective operations before and after reaching the threshold number, as described in FIG. 6.

Alternatively, responsive to the determination that the likelihood does not satisfy the classification test, the process 300 can end.

Figure 4:
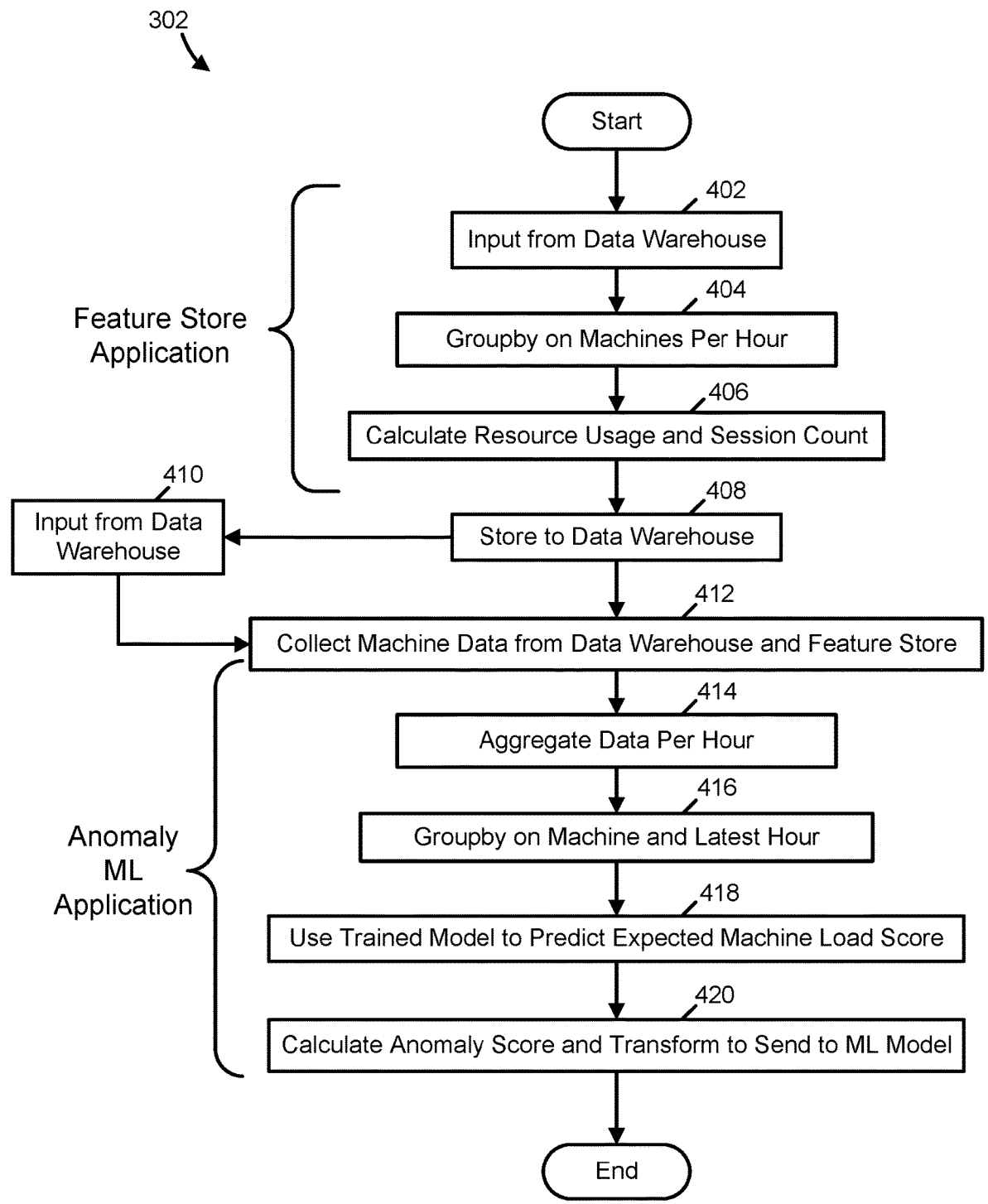
FIG. 4 is a flow diagram of a process for training a model to predict a session failure of a virtual service, in accordance with an example of the present disclosure.

FIG. 4 is a flow diagram of a process 302 for training a model to predict a session failure of a virtual service, in accordance with an example of the present disclosure. In this example, the process 302 may provide additional details of step 302 of the process 300 for proactively predicting a session failure of a virtual service in FIG. 3. In particular, the process 302 may provide additional details of obtaining the feature value of the anomaly score, which represents a standardized residual in a linear model of a machine's resource usage vs. its session count. Note that the process 302 is only one example of the step 302 of the process 300, and numerous other examples are possible, such as the other features for training the model described in the example of FIG. 5 below.

In some examples, the process 302 may be implemented by a session failure prediction service, which may execute on a workspace server, as in the examples of FIG. 1 above and FIG. 8 below. Alternatively or additionally, the process 302 may be executed by a server computer system or by another computer system, such as computing device 900 of the example of FIG. 9 below, or may be implemented within a virtualization infrastructure, as described in the example of FIG. 8 below, and is not limited by the present disclosure.

In some examples, the process 302 for training a model to predict a session failure may include two parts. For example, a feature store application and/or the session failure prediction service may compute the resource utilization and the session count, and the feature store application may store this information to a data warehouse, as described in operations 402-408 below. An anomaly application and/or the session failure prediction service may then predict the resource utilization and compute the anomaly score, as described in operations 410-420 below.

As shown in FIG. 4, the process for training a model to predict a session failure starts with the session failure prediction service receiving 402 input from a data warehouse.

Next, the session failure prediction service can groupby 404 on machines per hour. In an example, the system can use a "groupby" or "group by" command, for example in a data warehouse such as Hive, in order to aggregate or bin the received information per machine and per hour of elapsed time in the dataset before conducting a trend analysis.

Next, the session failure prediction service can calculate 406 the resource usage and session count. As described in the example of FIG. 2A above, the resource usage can be measured by a variable referred to as machine_load_score or final_out, while session count can be measured by the sum of a variable referred to as payload_sessioncount. These variables may be obtained and/or computed based on data from a database or data warehouse, which may be representative of resource usage of a machine or virtual service.

For example, the system may collect data from metrics available from "raw_gold_db.cas_research_x_monitor_current." The resource usage may be represented using a resource utilization score called "machine_load_score," which the system can compute from payload_sessionindex, payload_effectiveloadindex, payload_memoryindex, payload_percentcpu, payload_cpuindex, payload_usedmemory, payload_totalmemory, and payload_sessioncount. For example, the system can normalize these values into the range 0 to 1 and sum them to obtain the machine_load_score, which indicates the machine's resource usage, and may also be referred to as final_out.

The payload_effectiveloadindex may be an indicator of the load on a machine or virtual service, which may be obtained from the brokering process. The payload_sessioncount may indicate a number of sessions on a machine or virtual service. The payload_sessionindex may be a normalized number that defines the current session load on a machine or virtual service and is comparable across different machines or virtual services. The payload_memoryindex may be representative of effective strain calculated on the memory. The payload_cpuindex may be representative of effective load on the CPU of a machine or virtual service.

Next, the session failure prediction service can store 408 the calculated resource usage and session count information to a data warehouse, for example Hive. In some examples, a feature store application can store the resource usage and session count information to a data warehouse.

Next, in operations 410-420, the session failure prediction service can predict the resource utilization and compute the anomaly score via an anomaly score ML application. For example, the feature store application may build out and store features in the data warehouse, as in operations 402-408 above, and periodically later the ML application can retrieve and process the features, as in operations 410-420.

In one example, the session failure prediction service can then receive 410 input from a data warehouse, such as Hive. In an example, the received input may include the calculated resource usage and session count information previously stored during operation 408. In some examples, the session failure prediction service periodically receives the feature store input from the data warehouse. The application input data from the feature store and/or the data warehouse may be passed to the anomaly application.

Next, the session failure prediction service can collect 412 machine data from a data warehouse, for example Hive, and/or from the feature store. For example, the machine data can include disaggregated data about machine failures, resource usage, and/or session count.

Next, the session failure prediction service can aggregate 414 the collected machine data per hour.

Next, the session failure prediction service can groupby 416 the aggregated data on machine and the most recent hour available.

Next, the session failure prediction service can use 418 the trained model to predict an expected machine load score based on the session count. For example, the session failure prediction service can apply the regression model, such as a linear model, using the fitted parameter values, for example from the feature store, on the session count collected 412 from the data warehouse in order to predict the machine load score.

Next, the session failure prediction service can calculate 420 an anomaly score. As described in the example of FIG. 2A, the system can compute the anomaly score as a residual in the trained model, according to: Anomaly_score=Predicted machine_load_score−actual machine_load_score. The system can transform the calculated anomaly score, for example as a z-score measuring how many standard deviations the raw anomaly score is away from its mean value, as described in FIG. 2B above: Standardized_anomaly_score=z-score in the distribution of anomaly score with respect to session counts= (Anomaly_score−Average of anomaly_score)/Standard deviation of anomaly_score. The session failure prediction service can then send the transformed anomaly score to the ML model.

The process 302 may then end.

Figure 5:
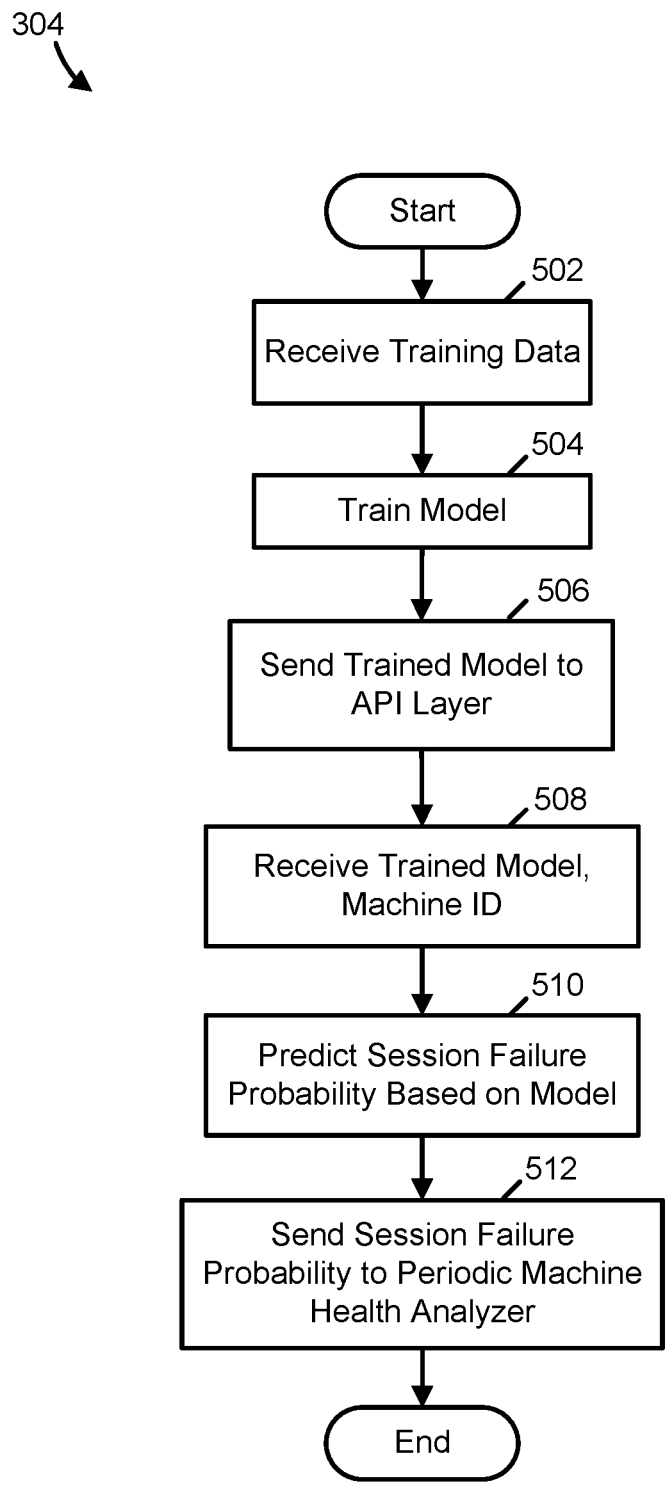
FIG. 5 is a flow diagram of a process for training a model to predict a session failure of a virtual service, in accordance with an example of the present disclosure.

FIG. 5 is a flow diagram of a process 304 for training a model to predict a session failure of a virtual service, in accordance with an example of the present disclosure. In this example, the process 304 may provide additional details of step 302 of the process 300 for proactively predicting a session failure of a virtual service in FIG. 3. In some examples, the process 304 may be implemented by a session failure prediction service and/or other services, which may execute on a workspace server, as in the examples of FIG. 1 above and FIG. 8 below. Alternatively or additionally, the process 304 may be executed by a server computer system or by another computer system, such as computing device 900 of the example of FIG. 9 below, or may be implemented within a virtualization infrastructure, as described in the example of FIG. 8 below, and is not limited by the present disclosure.

As shown in FIG. 5, the session failure prediction process starts with the session failure prediction service and/or a model training service receiving 502 training data, such as a training dataset. For example, the training dataset can include recent and/or historical data of previous sessions on a given node and/or previous sessions within a virtual applications and desktops service. In an example, the training dataset may even include session data across multiple services, for example aggregated by a server such as the workspace server.

Next, the session failure prediction service and/or the model training service can train 504 the model. Training 504 the model can be based on the received training dataset. For example, the system can train 504 the model based on features such as the standardized anomaly score, as described in the examples of FIGS. 2A, 2B, and 4 above.

Other features that may be used in training 504 the model may include: device and/or machine identifiers (deviceIDs/machineIDs); CPU usage trend statistics, such as a current CPU usage percentage—a rolling average of CPU usage percentage during session failures (e.g., in the last 7 days); memory usage trend statistics, such as a current memory usage percentage—a rolling average of memory usage percentage during session failures (e.g., in the last 7 days); remaining memory available (e.g., in MB) or maximum memory—current memory; disk usage trend statistics, such as a current disk usage percentage—a rolling average of disk usage percentage during session failures (e.g., in the last 7 days); load index; ICA latency; UX scores obtained from the system; disk latency; health check store; number of sessions; last session failure flag, such as a Boolean flag indicating whether the last attempted session was successful; number of failures in the last four attempted sessions; operating system (OS) of the machine; and time elapsed since last attempted session.

Alternatively or additionally, the system can use any other features, and is not limited by the present disclosure. The chosen parameters and training strategy can enable the models to learn from historical information as well as recent trends. The numerical parameters can be normalized, and the model can be trained on the given time interval's data in a supervised classification manner. In various examples, a variety of models may be used, for example DNNs, CNNs, RNNs, LSTMs, or ensemble models. In an example, the model can include a soft-max layer as the last layer to quantify the session failure probability.

Next, the session failure prediction service and/or the model training service can send 506 the trained model to an ML application, which may be exposed via an API layer.

Next, the session failure prediction service and/or the ML application can receive 508 the trained model and machine ID. For example, the session failure prediction service and/or the ML application may receive 508 the machine ID from a periodic machine health analyzer, as in the example of FIG. 1 above.

Next, the session failure prediction service and/or the ML application can predict 510 the session failure probability based on the received model. For example, the system can apply the received model (e.g., a DNN, CNN, RNN, LSTM, or ensemble model) to predict 510 the session failure probability.

Next, the session failure prediction service and/or the ML application can send 512 the session failure probability to the periodic machine health analyzer. As described in the examples of FIG. 3 above and FIG. 6 below, the periodic machine health analyzer and/or the session failure prediction service can use thresholds to warn for failures at different levels of strictness, as needed. The system can also use the output probabilities to route user session requests to active nodes for user priority-based resource allocation, keeping tighter session failure constraints for high priority users, as described in FIGS. 7A-7C.

The process 304 can then end.

Figure 6:
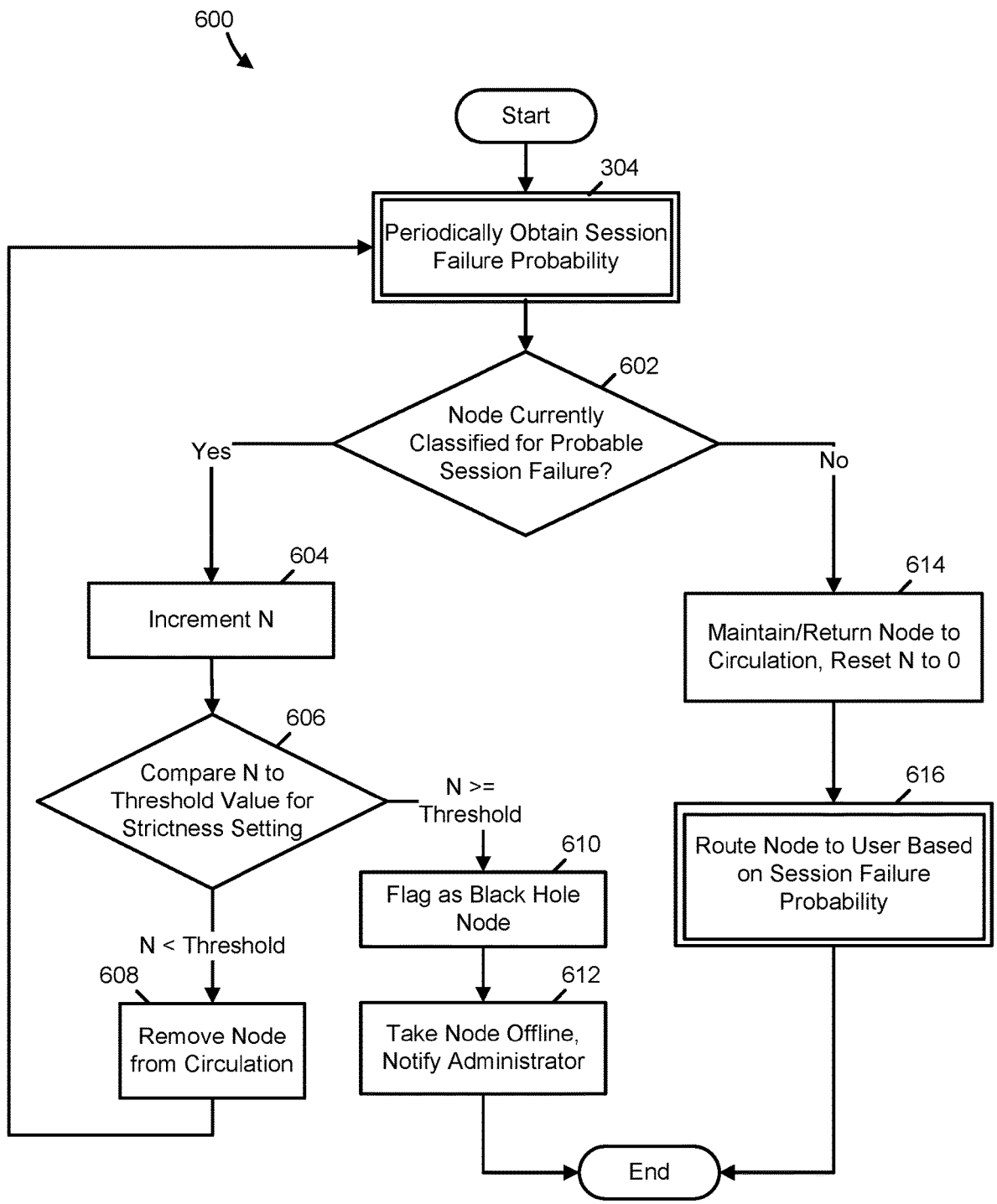
FIG. 6 is a flow diagram of a process for routing user session requests to active nodes, in accordance with an example of the present disclosure.

FIG. 6 is a flow diagram of a process 600 for routing user session requests to active nodes, in accordance with an example of the present disclosure. In some examples, the process 300 may be implemented by a session failure prediction service, a periodic machine health analyzer, and/or an ML application, which may execute on a workspace server, as in the examples of FIG. 1 above and FIG. 8 below. Alternatively or additionally, the process 600 may be executed by a server computer system or by another computer system, such as computing device 900 of the example of FIG. 9 below, or may be implemented within a virtualization infrastructure, as described in the example of FIG. 8 below, and is not limited by the present disclosure. In various examples, the virtual service can include a VDA or a virtual machine manager, such as a hypervisor. In some examples, the system can predict session failure of a physical machine, such as a computing node or another computing device, and is not limited by the present disclosure.

As described in this example, the session failure prediction service can run the ML models and/or techniques disclosed herein periodically (e.g., at set time intervals), and can predict the failure probability of the various machines (e.g., VDAs). In some examples, the system may use a strictness setting, which may control the strictness of the system's flagging of nodes as black holes, as described herein. If the highest level of strictness is set, then immediately when a given node is classified 602 as a probable session failure, the system may alert the administrator and execute a corrective operation, such as ending the session, disabling or restarting the node or virtual service, and/or rendering a user notification, as described in operations 610 and 612 below.

Alternatively, if a lower level of strictness is set, then even if a machine is flagged as a probable one for session failure, it may not be immediately flagged for a corrective operation. In some cases, unhealthy machines may revert to an improved or healthier state over time, for example due to a reduction in machine load, or if a temporary error (due to an application restart, service, and/or communication) resolves itself. In an example with a low strictness setting, to improve UX, the system may initially put the node on hold and/or remove the node from circulation on a trial basis, as described in the operation 608 below. If the node is subsequently classified as having a low failure probability, the system can return the node to the list of working VDAs, as in operation 614. Alternatively, if the node remains in the likely-failure classification for a threshold number of times consecutively, then the system can flag the node as a black hole node, alert the administrator, and execute corrective operations.

As shown in FIG. 6, the process for proactively predicting a session failure starts with the session failure prediction service periodically obtaining 304 a session failure probability, as described in the examples of FIGS. 1, 3, and 5 above.

Next, the session failure prediction service can determine 602 whether the node is currently classified for probable session failure. For example, the system can make this determination by comparing a quantitative session failure probability or likelihood to a threshold value, by classifying the node into a high likelihood-of-failure category, or by using any other classification test, as described in the examples of FIGS. 2A and 3 above.

Responsive to the node being classified for probable session failure, the session failure prediction service can then optionally increment 604 a counter N of a number of times the node has been classified for probable session failure. In some examples, N may count the number of times this classification has occurred consecutively.

Next, the session failure prediction service can optionally compare 606 the value of N to a threshold value for the given strictness setting.

In some examples, the system uses a strictness setting, which may set a threshold value that controls the system's response to N. The strictness setting may be set by a user or an administrator, for example, or may have a default value. The strictness setting may be associated with a corresponding threshold value for N. In a simple example, the threshold value may be a maximum value minus the strictness setting rounded to an integer: threshold value=maximum value−int (strictness). In such an example, the highest strictness setting would correspond to a threshold value of 1, while a low strictness setting would correspond to the maximum threshold value. In another example, the threshold value may toggle between 1 for a low strictness setting and some fixed value (e.g., 3, 4, or another fixed value) for a high strictness setting. In yet other examples, the threshold value may be any function of the strictness setting. Alternatively, in some examples, the system may not make use of a strictness setting, or equivalently may fix the threshold value to equal 1.

Responsive to N being less than the threshold value, the session failure prediction service may then remove 608 the node from circulation, for instance on a trial basis. For example, new sessions may not be assigned to the node. Accordingly, the disclosed system and methods can improve system reliability and UX by proactively taking measures to remove unreliable nodes from circulation, thereby reducing the probability that users experience system failures. The session failure prediction service can then return to operation 304, to periodically obtain 304 a session failure probability. If the same node is eventually removed from the probable session failure classification (e.g., by being classified as having a low failure probability), the node can be returned to circulation and/or routed to a user, as described in operation 614 below.

Responsive to N equaling or exceeding the threshold value, the session failure prediction service may then flag 610 the machine as a black hole.

The session failure prediction service may then execute a corrective operation 612, for example notifying an administrator and/or taking the node offline. In various other examples, the corrective operation can include ending the session, disabling or restarting the node or virtual service, and/or rendering a user notification. Accordingly, the disclosed system and methods can improve system reliability and UX by proactively taking measures to correct problems and/or proactively disabling unreliable nodes, thereby minimizing the probability that users experience system failures. The process 600 can then end.

Responsive to the node not being classified for probable session failure, the session failure prediction service can maintain 614 the node in circulation and/or return the node to circulation. For example, if the node is already in circulation, the system can maintain it in circulation responsive to it not being classified for probable session failure. If the node is not in circulation (for example because it has previously been removed from circulation, as in operation 608), the system can return it to circulation in response to it not being classified for probable session failure.

In some examples, if the strictness setting requires a threshold number of consecutive classifications before flagging 610 as a black hole node and/or executing 612 corrective operations, the system can also reset N to 0. For example, the system may reset N because in the current time interval the node is not classified for probable session failure, and therefore any future classifications for probable session failure would not be consecutive with any such classifications in the past.

Alternatively, in some examples, the system may not require the threshold number of classifications for probable session failure to be consecutive, and is not limited by the present disclosure. For example, the system may flag 610 the black hole node and/or execute 612 corrective operations after a threshold number of classifications for probable session failure within a larger number of time intervals, for example three classifications within eight time intervals. Accordingly, the system can decrement N when sufficient time intervals have passed without classifications for probable session failure.

Next, the session failure prediction service can route 616 the node to a user based on the session failure probability. In particular, because the node has not been classified for probable session failure and is being maintained 614 in active circulation, the system can route the node to fulfill user requests. In various examples, the system may make use of various techniques to improve system reliability and user experience by ensuring that user requests are fulfilled promptly and with a reliable node. Several examples of techniques for routing the node to a user based on the session failure probability are described in FIGS. 7A-7C below.

The process 600 can then end.

Figure 7A:
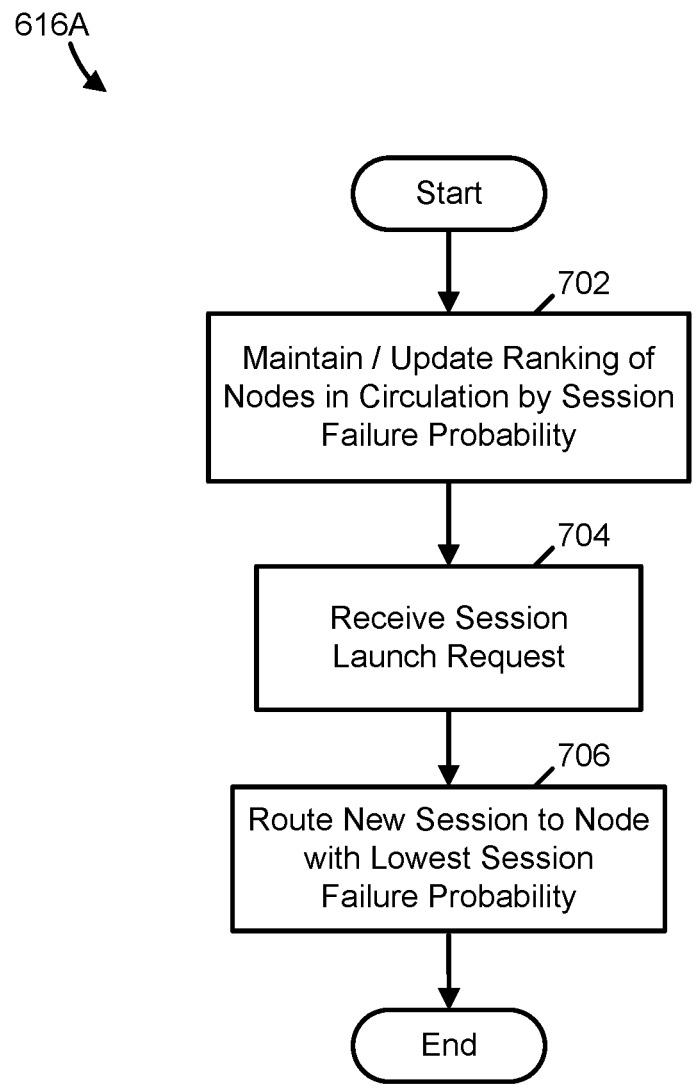
FIG. 7A is a flow diagram of a process for routing user session requests to active nodes based on a predicted session failure probability, in accordance with an example of the present disclosure.

FIG. 7A is a flow diagram of a process 616A for routing user session requests to active nodes based on a predicted session failure probability, in accordance with an example of the present disclosure. In this example, the process 616A may provide additional details of step 616 of the process 600 for proactively predicting a session failure of a virtual service in FIG. 6. In some examples, the process 616A may be implemented by a session failure prediction service, which may execute on a workspace server, as described in the examples of FIG. 1 above and FIG. 8 below. Alternatively or additionally, the process 616A may be executed by a server computer system or by another computer system, such as computing device 900 of the example of FIG. 9 below, or may be implemented within a virtualization infrastructure, as described in the example of FIG. 8 below, and is not limited by the present disclosure.

In various examples, the virtual service can include a VDA or a virtual machine manager, such as a hypervisor. In some examples, the system can predict session failure of a physical machine, such as a computing node or another computing device, and is not limited by the present disclosure. The virtual service, VDA, virtual machine manager, and/or physical machine may be referred to herein generally as a machine or a node.

As shown in FIG. 7A, the process for routing user session requests starts with the session failure prediction service maintaining and/or updating 702 a ranking of nodes in circulation by session failure probability. For example, the session failure prediction service can periodically obtain the session failure probabilities of the nodes via an ML prediction, as described in FIGS. 3-5 above. Based on the session failure probabilities, the session failure prediction service can maintain and/or update 702 the ranking of nodes, for example by executing a sorting process. Note that, in some examples, the obtained session failure probabilities may be quantitative probabilities, for example if the last layer of the classification ML process is a softmax layer. Accordingly, a strict ordering or ranking of the nodes in circulation by session failure probability may be possible.

Next, the session failure prediction service can receive 704 a session launch request, for example from a user. For example, the session launch request may include a request for a virtual service session, a VDA session, a virtual machine manager session, or a physical machine session (e.g., a computing node or device), and is not limited by the present disclosure.

Next, the session failure prediction service can route 706 a new session to the available node with the least probability for failure. For example, the failure prediction service can use the ranking of machines in circulation by session failure probability to determine the machine with the least probability for failure, for example by selecting the first machine in the ranking. Accordingly, the disclosed system and methods can improve system reliability and user experience by ensuring that each user request is fulfilled with the most reliable machine available, thereby minimizing the probability that users experience system failures.

The process 616A can then end.

Figure 7B:
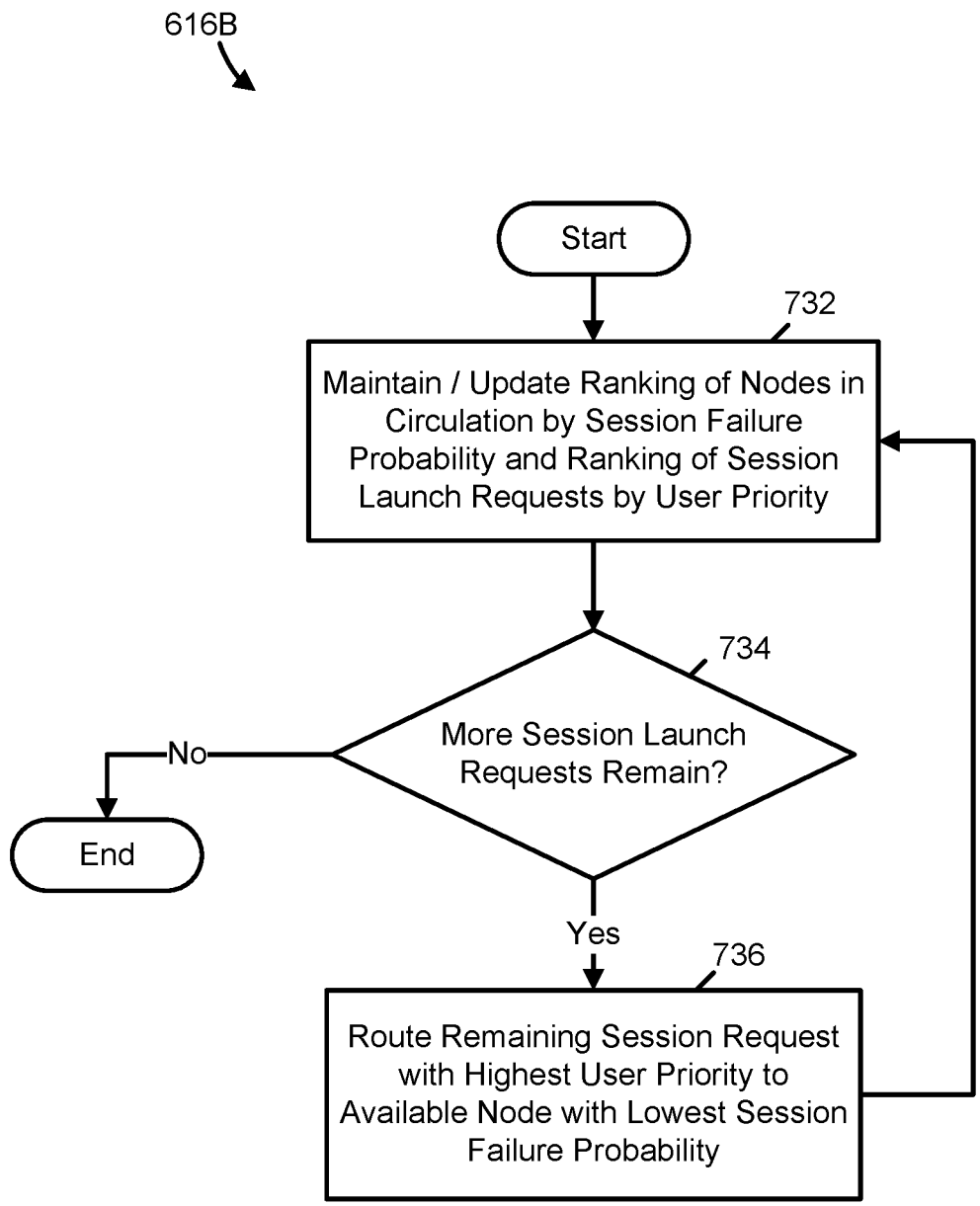
FIG. 7B is a flow diagram of a process for routing user session requests to active nodes based on a predicted session failure probability and a user priority, in accordance with an example of the present disclosure.

FIG. 7B is a flow diagram of a process 616B for routing user session requests to active nodes based on a predicted session failure probability and a user priority, in accordance with an example of the present disclosure. In this example, the process 616B may provide additional details of step 616 of the process 600 for proactively predicting a session failure of a virtual service in FIG. 6. In some examples, the process 616B may be implemented by a session failure prediction service, which may execute on a workspace server, as in the examples of FIG. 1 above and FIG. 8 below. Alternatively or additionally, the process 616B may be executed by a server computer system or by another computer system, such as computing device 900 of the example of FIG. 9 below, or may be implemented within a virtualization infrastructure, as described in the example of FIG. 8 below, and is not limited by the present disclosure.

In various examples, the virtual service can include a VDA or a virtual machine manager, such as a hypervisor. In some examples, the system can predict session failure of a physical machine, such as a computing node or another computing device, and is not limited by the present disclosure.

As shown in FIG. 7B, the process for routing user session requests starts with the session failure prediction service maintaining and/or updating 732 a ranking of nodes in circulation by session failure probability as well as a ranking of session launch requests by user priority. For example, the system may receive multiple session launch requests from users. The session failure prediction service can determine the corresponding user priority of each request, for example by a lookup operation. In another example, a priority may be associated with each respective request, and therefore may be included with the respective request. For example, the priority may be combined with the request in a data structure. Accordingly, having obtained the priority information, the session failure prediction service can maintain and/or update 732 the ranking of session launch requests by user priority, for example using a sorting process.

Likewise, the session failure prediction service can periodically obtain the session failure probabilities of the nodes via an ML prediction, as described in FIGS. 3-5 above. Based on the session failure probabilities, the session failure prediction service can maintain and/or update 732 the ranking of nodes, for example via sorting. Note that, as described in the example of FIG. 7A above, the obtained session failure probabilities may be quantitative probabilities, so strict ordering or ranking of the nodes may be possible.

Next, the session failure prediction service can determine 734 whether more session launch requests remain. For example, when the system receives a new session launch request, e.g. from a user, it may add the new request to a queue, and/or to the ranking of requests by priority described in operation 732 above. The session failure prediction service can then check 734 whether more session launch requests remain in the queue and/or ranking. Responsive to no session launch requests remaining, the process 616B can end.

Responsive to session launch requests remaining in the queue and/or ranking, the session failure prediction service can then route 736 a remaining session request with highest user priority to an available node with lowest session failure probability.

For example, the session failure prediction service can use the ranking of session launch requests by user priority to determine the session request with highest user priority, for example by selecting a first or highest-ranked session request in the ranking. Likewise, the failure prediction service can use the ranking of machines in circulation by session failure probability to determine the machine with the least probability for failure, for example by selecting the first machine in the ranking. Accordingly, the disclosed system and methods can improve system reliability and user experience by ensuring that the highest-priority user requests are fulfilled with the most reliable nodes available, thereby minimizing the probability that the highest-priority users, sessions, and/or applications experience system failures.

The session failure prediction service can then return to operation 732, to maintain and/or update 732 the ranking of nodes in circulation by session failure probability and the ranking of session launch requests by user priority. For example, if there is a current queue or ranking with multiple session launch requests, the system can continue to ensure 732 these requests are ranked by user priority. In another example, if the system receives new session launch requests, it can insert the new requests to the proper positions in the queue and/or ranking, ensuring that the requests remain ranked by user priority. The system can subsequently continue to route 736 the requests according to priority to the most reliable nodes available, until all requests in the queue and/or ranking have been satisfied. The process 616B can then end.

Figure 7C:
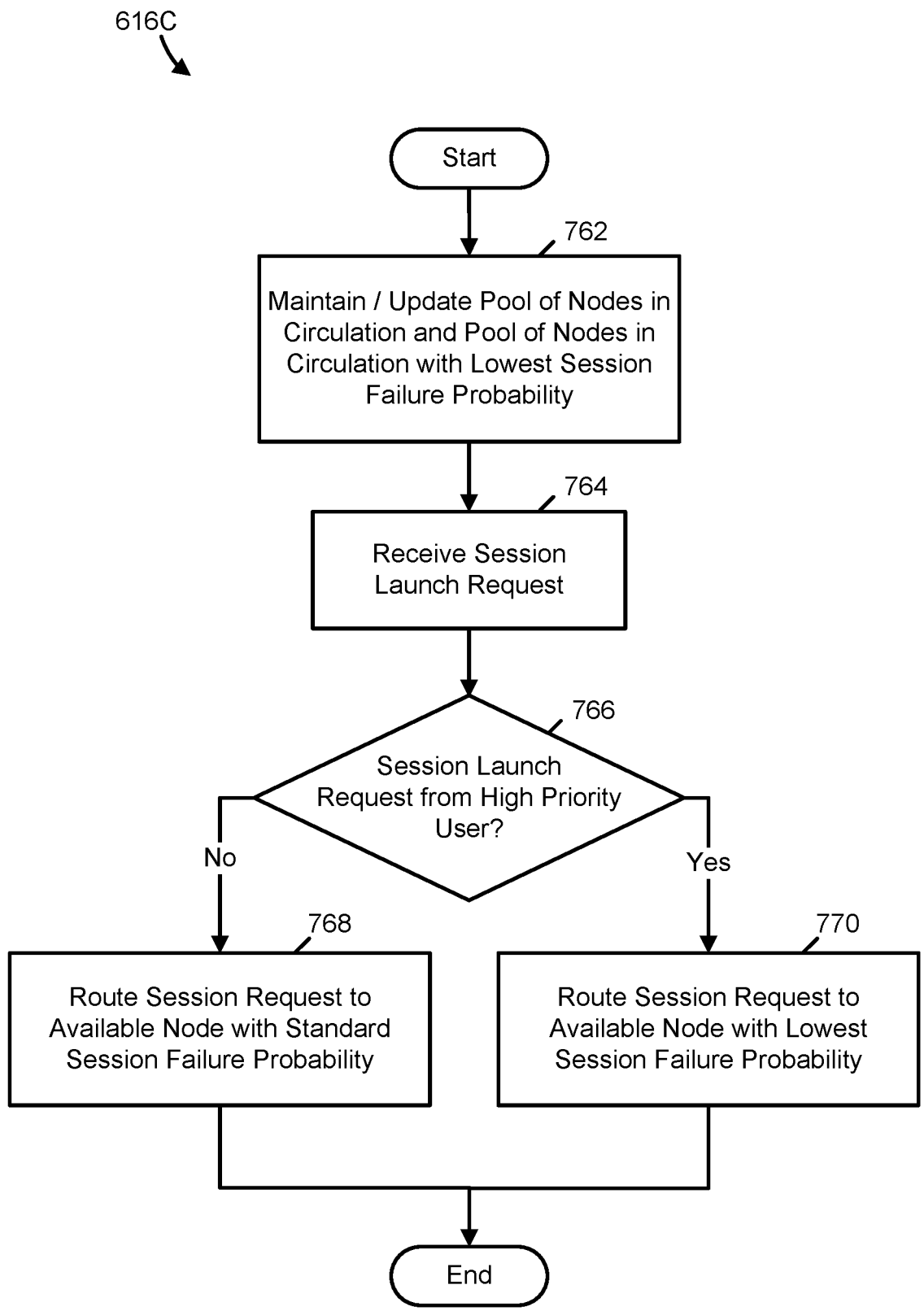
FIG. 7C is a flow diagram of a process for routing user session requests to active nodes based on a predicted session failure probability and a user priority, in accordance with an example of the present disclosure.

FIG. 7C is a flow diagram of a process 616C for routing user session requests to active nodes based on a predicted session failure probability and a user priority, in accordance with an example of the present disclosure. In this example, the process 616C may provide additional details of step 616 of the process 600 for proactively predicting a session failure of a virtual service in FIG. 6. In some examples, the process 616C may be implemented by a session failure prediction service, which may execute on a workspace server, as in the examples of FIG. 1 above and FIG. 8 below. Alternatively or additionally, the process 616C may be executed by a server computer system or by another computer system, such as computing device 900 of the example of FIG. 9 below, or may be implemented within a virtualization infrastructure, as described in the example of FIG. 8 below, and is not limited by the present disclosure. In various examples, the virtual service can include a VDA or a virtual machine manager, such as a hypervisor. In some examples, the system can predict session failure of a physical machine, such as a computing node or another computing device, and is not limited by the present disclosure.

As shown in FIG. 7C, the process for routing user session requests starts with the session failure prediction service maintaining and/or updating 762 a general pool of nodes in circulation, as well as a pool of nodes in circulation with lowest session failure probability. For example, these may be two separate pools. In one example, the general pool of nodes in circulation may include all available nodes, while the pool of nodes with lowest session failure probability may be a subset of those nodes in circulation that meet a criterion or satisfy a classification test with respect to having a low probability of failure. Alternatively, the two pools may be disjoint sets, that is, the general pool of nodes in circulation may include only nodes that fail to satisfy the test of low failure probability, while the pool of nodes with lowest failure probability may include only nodes that do satisfy the test. Note that examples where the two pools are disjoint may provide stronger matching of node reliability to user priority.

In an example, the session failure prediction service can periodically obtain the session failure probabilities of the nodes via an ML prediction, as described in FIGS. 3-5 above. Based on the session failure probabilities, the session failure prediction service can maintain and/or update 762 the pool of nodes in circulation with lowest session failure probability. In various examples, the system can apply various criteria to select the nodes with lowest session failure probability. Note that the obtained session failure probabilities may be quantitative probabilities, thus a comparison to a quantitative criterion is possible in some examples. For example, the session failure prediction service may compare the session failure probabilities to a threshold or cutoff value, execute a classification test, or select a set proportion of the nodes having the lowest session failure probability. For example, the system may select the 1%, 5%, 10%, 15%, 25%, 40%, or 50% of nodes having the lowest session failure probability.

Next, the session failure prediction service can receive 764 a session launch request, for example from a user. For example, the session launch request may include a request for a virtual service session, a VDA session, a virtual machine manager session, or a remote session on a physical machine (e.g., a computing node or device), and is not limited by the present disclosure.

Next, the session failure prediction service can determine 766 whether the session launch request is associated with a high priority user. For example, the session failure prediction service can receive 764 the session launch request from a user, and hence can determine the corresponding user priority, for example by executing a lookup. In another example, the priority may be associated with the individual request, and therefore may be included as part of the request, for example within a data structure accompanying the request or including the request.

In some examples, the determination 766 may be a binary determination. For example, the user priority may be represented as a binary or categorical value, e.g. with values such as "low priority" and "high priority." In this case, if the user priority is in the "high priority" category, the system can determine 766 that the session launch request is associated with a high priority user. In another example, the system can make a binary determination based on a quantitative user priority, for example by comparing the quantitative user priority to a threshold or cutoff value.

In some examples, the system may make use of multiple categories of user priority and match them with multiple categories of failure probability, and is not limited by the present disclosure. For example, the user priority may be represented as "low priority," "medium priority," and "high priority." In this case, the disclosed system can use three corresponding pools of nodes, such as nodes with "low session failure probability," "medium session failure probability," and "high session failure probability." The system may then route low priority requests to the pool of nodes with low session failure probability, medium priority requests to the pool of nodes with medium session failure probability, and high priority requests to the pool of nodes with high session failure probability. In various examples, the system may make use of any other number of categories of user priority and/or failure probability.

Next, responsive to the session launch request not being associated with a high priority user, the session failure prediction service can route 768 the received session request to an available node with a standard session failure probability. For example, the session failure prediction service can route the session request to an available node from the general pool of nodes in circulation.

Next, responsive to the session launch request being associated with a high priority user, the session failure prediction service can route 770 a session request to an available node with a lowest session failure probability. For example, the session failure prediction service can route the session request to an available node from the pool of nodes in circulation with lowest session failure probability. Accordingly, the disclosed system and methods can improve system reliability and UX by ensuring that high-priority user requests are fulfilled with available nodes from the highest-reliability category, thereby minimizing the probability that the highest-priority users, sessions, and/or applications experience system failures.

In another example, the failure prediction service may use rankings even within the categories. For example, the failure prediction service may use a ranking of machines by session failure probability to route the machine with the least probability for failure, and/or may use a ranking of session launch requests by user priority to route the most important or urgent requests first. A person skilled in the art will appreciate that other variations are possible in light of this disclosure.

Computer System Configured to Predict Session Failure

Figure 8:
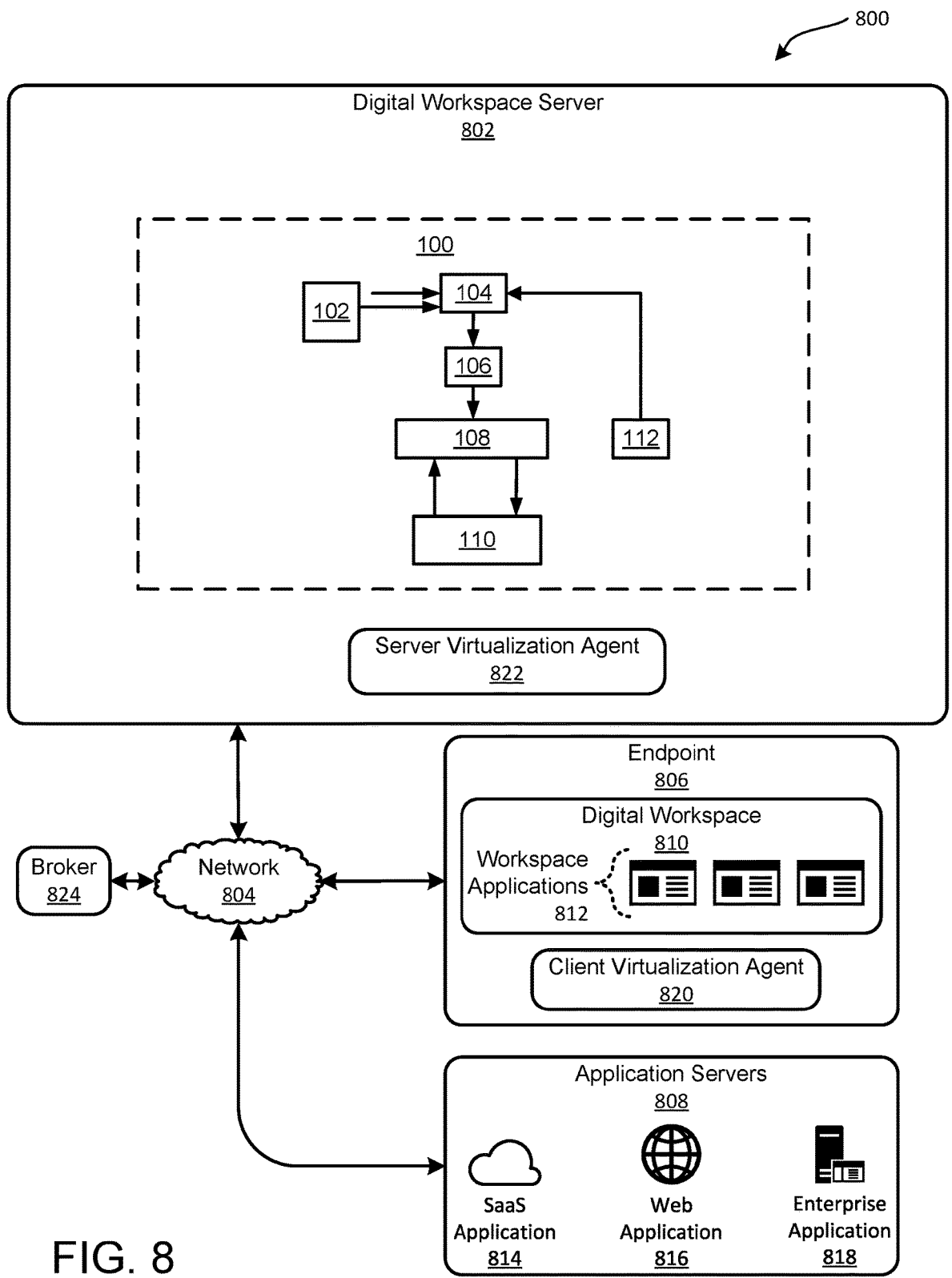
FIG. 8 is a block diagram of an example system for proactively predicting a session failure of a virtual service, in accordance with an example of the present disclosure.

FIG. 8 is a block diagram of an example system 800 for proactively predicting session failure of a virtual service, in accordance with an example of the present disclosure. The system 800 includes a digital workspace server 802 that is capable of carrying out the methods disclosed herein. The user's association with the endpoint 806 may exist by virtue of, for example, the user being logged into or authenticated to the endpoint 806. While only one endpoint 806 and three example application servers 808 are illustrated in FIG. 8 for clarity, it will be appreciated that, in general, the system 800 is capable of hosting connections between an arbitrary number of endpoints and an arbitrary number of application servers. The digital workspace server 802, the endpoint 806, and the application servers 808 communicate with each other via a network 804. The network 804 may be a public network (such as the Internet) or a private network (such as a corporate intranet or other network with restricted access). Other examples may have fewer or more communication paths, networks, subcomponents, and/or resources depending on the granularity of a particular implementation. For example, in some implementations at least a portion of the application functionality is provided by one or more applications hosted locally at an endpoint. Thus references to the application servers 808 should be understood as encompassing applications that are locally hosted at one or more endpoints. It should therefore be appreciated that the examples described and illustrated herein are not intended to be limited to the provision or exclusion of any particular services and/or resources.

The digital workspace server 802 is configured to host the system 100 for proactively predicting a session failure (which may include the resource utilization ML model 102, pre-processing 104, training 106, ML application 108, periodic machine health analyzer 110, and/or trigger module 112, as described in FIG. 1), and the server virtualization agent 822. The digital workspace server 802 may comprise one or more of a variety of suitable computing devices, such as a desktop computer, a laptop computer, a workstation, an enterprise-class server computer, a tablet computer, or any other device capable of supporting the functionalities disclosed herein. A combination of different devices may be used in certain examples. As illustrated in FIG. 8, the digital workspace server 802 includes one or more software programs configured to implement certain of the functionalities disclosed herein as well as hardware capable of enabling such implementation.

As noted above, in certain examples the endpoint 806 can be a computing device that is used by the user. Examples of such a computing device include but are not limited to, a desktop computer, a laptop computer, a tablet computer, and a smartphone. The digital workspace server 802 and its components are configured to interact with a plurality of endpoints. In an example, the user interacts with a plurality of workspace applications 812 that are accessible through a digital workspace 810, which can serve as a workspace client application, for example executing as part of a VDA or another virtual service, as discussed above. The user's interactions with the workspace applications 812 and/or the application servers 808 may be tracked, monitored, and analyzed by the workspace service. Any microapps can be made available to the user through the digital workspace 810, thereby allowing the user to view information and perform actions without launching (or switching context to) the underlying workspace applications 812. The workspace applications 812 can be provided by the application servers 808 and/or can be provided locally at the endpoint 806. For instance, the example workspace applications 812 include a SaaS application 814, a web application 816, and an enterprise application 818, although any other suitable existing or subsequently developed applications can be used as well, including proprietary applications and desktop applications. To enable the endpoint 806 to participate in a virtualization infrastructure facilitated by the broker computer 824 and involving the server virtualization agent 822 as discussed herein, the endpoint 806 also hosts the client virtualization agent 820.

The broker computer 824 is configured to act as an intermediary between the client virtualization agent 820 and the server virtualization agent 822 within the virtualization infrastructure. In some examples, the broker computer 824 registers virtual resources offered by server virtualization agents, such as the server virtualization agent 822. In these examples, the broker computer 824 is also configured to receive requests for virtual resources from client virtualization agents, such as the client virtualization agent 820, and to establish virtual computing sessions involving the client virtualization agent 820 and the server virtualization agent 822.

Note that other architectures are possible for the virtualization infrastructure. For example, an additional server may host the server virtualization agent 822 separately from the digital workspace server 802. Accordingly, this additional server may be selected by the broker computer 824 to support virtual services.

Computing Device

Figure 9:
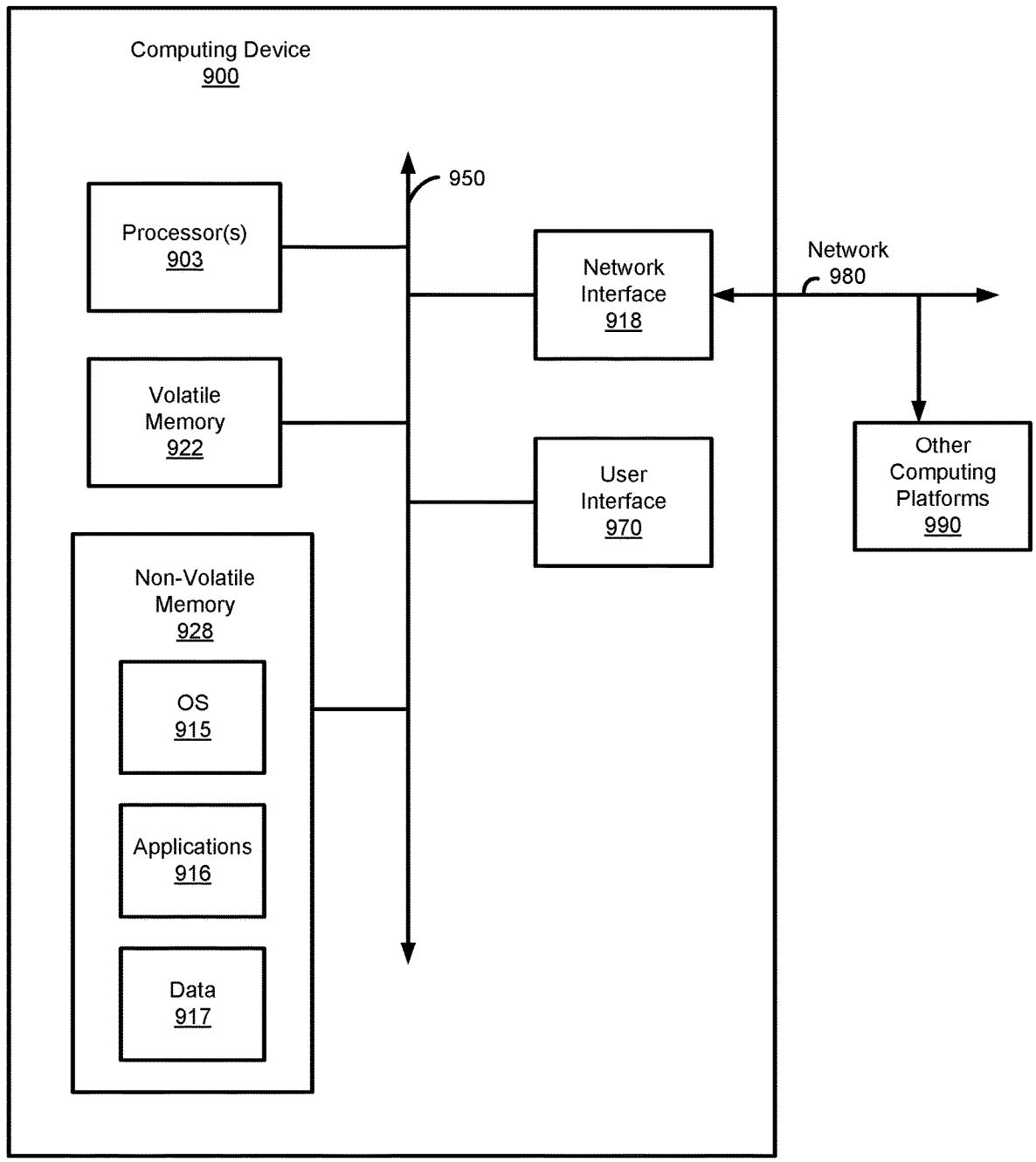
FIG. 9 is a block diagram of a computing device configured to implement various systems and processes in accordance with examples disclosed herein.

FIG. 9 is a block diagram of a computing device configured to implement various systems and processes in accordance with examples disclosed herein.

The computing device 900 includes one or more processor(s) 903, volatile memory 922 (e.g., random access memory (RAM)), non-volatile memory 928, a user interface (UI) 970, one or more network or communication interfaces 918, and a communications bus 950. The computing device 900 may also be referred to as a client device, computing device, endpoint device, computer, or a computer system.

The non-volatile (non-transitory) memory 928 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 970 can include a graphical user interface (GUI) (e.g., controls presented on a touchscreen, a display, etc.) and one or more input/output (I/O) devices (e.g., a mouse, a keyboard, a microphone, one or more speakers, one or more cameras, one or more biometric scanners, one or more environmental sensors, and one or more accelerometers, one or more visors, etc.).

The non-volatile memory 928 stores an OS 915, one or more applications or programs 916, and data 917. The OS 915 and the application 916 include sequences of instructions that are encoded for execution by processor(s) 903. Execution of these instructions results in manipulated data. Prior to their execution, the instructions can be copied to the volatile memory 922. In some examples, the volatile memory 922 can include one or more types of RAM and/or a cache memory that can offer a faster response time than a main memory. Data can be entered through the user interface 970 or received from the other I/O device(s), such as the network interface 918. The various elements of the device 900 described above can communicate with one another via the communications bus 950.

The illustrated computing device 900 is shown merely as an example client device or server and can be implemented within any computing or processing environment with any type of physical or virtual machine or set of physical and virtual machines that can have suitable hardware and/or software capable of operating as described herein.

The processor(s) 903 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can include one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor(s) 903 can be analog, digital or mixed. In some examples, the processor(s) 903 can include one or more local physical processors or one or more remotely located physical processors. A processor including multiple processor cores and/or multiple processors can provide functionality for parallel, simultaneous execution of instructions or for parallel, simultaneous execution of one instruction on more than one piece of data.

The network interfaces 918 can include one or more interfaces to enable the computing device 900 to access a computer network 980 such as a Local Area Network (LAN), a Wide Area Network (WAN), a Personal Area Network (PAN), or the Internet through a variety of wired and/or wireless connections, including cellular connections and Bluetooth connections. In some examples, the network 980 may allow for communication with other computing devices 990, to enable distributed computing. The network 980 can include, for example, one or more private and/or public networks over which computing devices can exchange data.

In described examples, the computing device 900 can execute an application on behalf of a user of a client device. For example, the computing device 900 can execute one or more virtual machines managed by a hypervisor. Each virtual machine can provide an execution session within which applications execute on behalf of a user or a client device, such as a hosted desktop session. The computing device 900 can also execute a terminal services session to provide a hosted desktop environment. The computing device 900 can provide access to a remote computing environment including one or more applications, one or more desktop applications, and one or more desktop sessions in which one or more applications can execute.

The processes disclosed herein each depict one particular sequence of acts in a particular example. Some acts are optional and, as such, can be omitted in accord with one or more examples. Additionally, the order of acts can be altered, or other acts can be added, without departing from the scope of the apparatus and methods discussed herein.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

The invention claimed is:

1. A server computer system configured to proactively predict a session failure of a virtual service, the server computer system comprising:
    a memory configured to store computer-executable instructions; and
    at least one processor coupled to the memory and configured to execute the instructions to:

obtain session count information indicating a quantity of sessions of the virtual service;
predict a resource utilization metric for the virtual service, based on the quantity of the sessions of the virtual service, and by fetching features selected from CPU usage trend statistics, memory usage trend statistics, disk usage trend statistics, and last session failure flags associated with the virtual service, or a combination thereof;
determining an anomaly score based on the predicted resource utilization metric associated with the virtual service;
evaluate a likelihood of the session failure of the virtual service within a future time interval based on the determined anomaly score and the predicted resource utilization metric by applying a supervised learning model;
determine that the likelihood of the session failure satisfies a classification test indicating the session failure is likely; and
responsive to the determination that the likelihood of the session failure satisfies the classification test, execute a corrective operation corresponding to the virtual service;
wherein the at least one processor is further configured to:
receive, from a user, a request to start a new session of the virtual service;
determining, based on the likelihood of the session failure of the virtual service, a node that has a lowest node failure probability among a plurality of nodes; and
route, based on determining that the user is a priority user, the request to the determined node;
wherein the corrective operation includes one or more of:
ending a user session that is utilizing the virtual service;
disabling the virtual service executing on the computer server system; or
restarting the virtual service executing on the computer server system; and
wherein the at least one processor further executes the instructions to: use a linear regression model to generate the resource utilization metric based on the obtained session count information and the fetched features,
wherein to evaluate the likelihood of the session failure of the virtual service comprises to perform a plurality of evaluations by periodically evaluating the likelihood of the session failure of the virtual service, and
wherein to determine that the likelihood of the session failure satisfies the classification test comprises to determine that the likelihood of the session failure satisfies the classification test for at least a threshold number of times of consecutive evaluations in the plurality of evaluations.

2. The server computer system of claim 1, wherein the anomaly score represents a residual value in the predicted resource utilization metric as a function of the quantity of the sessions defined by the session count information.

3. The server computer system of claim 1, wherein the anomaly score is a standardized anomaly score that indicates how many standard deviations a raw anomaly score of the virtual service is from a mean value of a plurality of anomaly scores.

4. The server computer system of claim 1, wherein to evaluate the likelihood of the session failure comprises to apply the supervised learning model to a record of previous sessions.

5. The server computer system of claim 4, wherein the supervised learning model comprises one or more of:
a deep neural network (DNN);
a convolutional neural network (CNN);
a recurrent neural network (RNN);
a long short-term memory (LSTM); or
an ensemble model.

6. The server computer system of claim 4, wherein the supervised learning model comprises a soft-max layer as a last layer, and wherein the likelihood of the session failure comprises a probability of the session failure.

7. The server computer system of claim 1, wherein the corrective operation further comprises rendering a user notification of the determination that the likelihood of the session failure satisfies the classification test.

8. The server computer system of claim 1, wherein the session failure comprises a session launch failure, an unresponsive state, or a persistent session failure.

9. The server computer system of claim 1, wherein the virtual service comprises a Virtual Delivery Agent (VDA) or a virtual machine manager.

10. A computer-implemented method comprising:
obtaining session count information indicating a quantity of sessions of the virtual service;
predicting a resource utilization metric for the virtual service, based on the quantity of the sessions of the virtual service, and by fetching features selected from CPU usage trend statistics, memory usage trend statistics, disk usage trend statistics, and last session failure flags associated with the virtual service, or a combination thereof;
determining an anomaly score for each of a plurality of nodes that provide the virtual service based on the predicted resource utilization metric associated with the virtual service;
generating a ranking for each node, the ranking representing a probability of node failure, by evaluating a likelihood of the session failure of the virtual service within a future time interval based on the determined anomaly score and the predicted resource utilization metric by applying a supervised learning model;
receiving, from a user, a request to start a new session of the virtual service; and
routing, based on determining that the user is a priority user, the request to a node, of the plurality of nodes, with the lowest probability of node failure,
wherein evaluating the likelihood of the session failure of the virtual service comprises:
performing a plurality of evaluations by periodically evaluating the likelihood of the session failure of the virtual service; and
determining that the likelihood of the session failure satisfies a classification test for at least a threshold number of times of consecutive evaluations in the plurality of evaluations.

11. The method of claim 10, wherein evaluating the likelihood of the session failure comprises applying the supervised learning model to a record of previous sessions.

12. The method of claim 11, wherein the supervised learning model comprises a soft-max layer as a last layer, and wherein the likelihood of the session failure comprises a probability of the session failure.

13. The method of claim 10, further comprising generating the resource utilization metric using a linear regression model based on the obtained session count information and the fetched features.

14. A non-transitory computer readable medium storing executable sequences of instructions to predict a session failure of a virtual service, the sequences of instructions comprising instructions to:
- obtain session count information indicating a quantity of sessions of the virtual service;
- predict a resource utilization metric for the virtual service, based on the quantity of the sessions of the virtual service, and by fetching features selected from CPU usage trend statistics, memory usage trend statistics, disk usage trend statistics, and last session failure flags associated with the virtual service, or a combination thereof;
- determining an anomaly score for each of a plurality of nodes that provide the virtual service based on the predicted resource utilization metric associated with the virtual service;
- generate a ranking, for each node, the ranking representing a probability of node failure by evaluating a likelihood of the session failure of the virtual service within a future time interval based on the determined anomaly score and the predicted resource utilization metric by applying a supervised learning model;
- receive, from a user, a request to start a new session of the virtual service; and
- route, based on determining that the user is a priority user, the request to a node, of the plurality of nodes, with the lowest probability of node failure,
- wherein evaluating the likelihood of the session failure of the virtual service comprises:
  - performing a plurality of evaluations by periodically evaluating the likelihood of the session failure of the virtual service; and
  - determining that the likelihood of the session failure satisfies a classification test for at least a threshold number of times of consecutive evaluations in the plurality of evaluations.

15. The non-transitory computer readable medium of claim 14, wherein the session failure comprises a session launch failure, an unresponsive state, or a persistent session failure.

16. The non-transitory computer readable medium of claim 14, wherein the at least one processor further executes the instructions to generate the resource utilization metric using a linear regression model based on the obtained session count information and the fetched features.

* * * * *